(12) United States Patent
Gubrinski et al.

(10) Patent No.: US 11,400,409 B2
(45) Date of Patent: Aug. 2, 2022

(54) PROCESS FOR AFTERTREATMENT OF REGENERATION OFFGAS

(71) Applicant: L'Air Liquide, Société Anonyme pour l'Etude et l'Exploitation des Procédés Georges Claude, Paris (FR)

(72) Inventors: Alfred Gubrinski, Frankfurt am Main (DE); Dorit Rappold, Frankfurt (DE); Michael Strozyk, Offenbach (DE); Sophia Schmidt, Frankfurt am Main (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 134 days.

(21) Appl. No.: 16/980,872

(22) PCT Filed: Mar. 8, 2019

(86) PCT No.: PCT/EP2019/025061
§ 371 (c)(1),
(2) Date: Sep. 15, 2020

(87) PCT Pub. No.: WO2019/174787
PCT Pub. Date: Sep. 19, 2019

(65) Prior Publication Data
US 2021/0008490 A1    Jan. 14, 2021

(30) Foreign Application Priority Data
Mar. 15, 2018 (EP) .................... 18400008

(51) Int. Cl.
*B01D 53/14* (2006.01)
*B01D 53/30* (2006.01)

(52) U.S. Cl.
CPC ..... *B01D 53/1425* (2013.01); *B01D 53/1412* (2013.01); *B01D 53/1418* (2013.01);
(Continued)

(58) Field of Classification Search
CPC ........ B01D 53/1456; B01D 2252/2021; B01D 53/30; B01D 2257/308; B01D 2257/504;
(Continued)

(56) References Cited

U.S. PATENT DOCUMENTS 10,065,147 B2 * 9/2018 O'Donnell ......... B01D 53/1425
2007/0134148 A1   6/2007 Gubrinski et al.

FOREIGN PATENT DOCUMENTS

DE    10 2005 059 101    6/2007

OTHER PUBLICATIONS

Werner, D., Gasreinigungsverfahren für grosse Wasserstoff-Mengen, Chemie Ingenieur Technik, Wiley VCh. Verlag, Weinhaime, DE, vol. 53, No. 2, Jan. 1, 1981, 73-81 with English abstract.
(Continued)

*Primary Examiner* — Timothy C Vanoy
(74) *Attorney, Agent, or Firm* — Elwood L. Haynes (57) ABSTRACT

The invention relates to a process for aftertreatment of gas streams in which unwanted components are present in an amount that varies irregularly in a periodic manner or over time and/or in a varying concentration, by means of an absorption or gas scrubbing process. For this purpose, during the entry of the desorption peak into the gas scrubbing apparatus, the amount of scrubbing medium is increased proceeding from a normal value during a first phase and, after the end of the desorption peak, the amount of scrubbing medium is returned back to the normal value during a second phase, wherein the laden scrubbing media are collected in different intermediate vessels during the two
(Continued)

phases, mixed and released as a mixture to a downstream scrubbing medium regeneration apparatus.

12 Claims, 3 Drawing Sheets

(52) U.S. Cl.
CPC ..... *B01D 53/1437* (2013.01); *B01D 53/1468* (2013.01); *B01D 53/30* (2013.01); *B01D 2252/2021* (2013.01); *B01D 2252/20468* (2013.01); *B01D 2252/20478* (2013.01); *B01D 2257/304* (2013.01); *B01D 2257/306* (2013.01); *B01D 2257/308* (2013.01)

(58) Field of Classification Search
CPC .......... B01D 2257/304; B01D 53/1418; B01D 53/1468; B01D 2252/20478; B01D 2252/608; B01D 2257/306; B01D 2252/20468; B01D 53/1425; B01D 53/1437; B01D 53/1412
See application file for complete search history.

(56) References Cited

OTHER PUBLICATIONS

International Search Report and Written Opinion for corresponding PCT/EP2019/025061, dated May 23, 2019.

\* cited by examiner

PROCESS FOR AFTERTREATMENT OF REGENERATION OFFGAS

CROSS REFERENCE TO RELATED APPLICATIONS

This application is a 371 of International Application No. PCT/EP2019/025061, filed Mar. 8, 2019, which claims priority to European Patent Application No. 18400008.1, filed Mar. 15, 2018, the entire contents of which are incorporated herein by reference.

BACKGROUND

Field of the Invention

The invention relates to a process for aftertreatment of gas streams in which unwanted, especially sulfur-containing, components are present in an amount that varies irregularly in a periodic manner or over time and/or in a varying concentration, by means of an absorption or gas scrubbing process. More particularly, the process comprises a scrubbing medium-based treatment of a regeneration offgas stream which is released from an adsorption unit, wherein the regeneration offgas stream is characterized by variation in the amount and/or concentration of the unwanted component over time, for example of the sulfur components.

State of the Art

The natural gas qualities of natural gas deposits that are currently being utilized are getting continuously worse. Therefore, the freeing of the natural gas from trace impurities, for example carbonyl sulfide (COS), mercury and especially mercaptans, is becoming increasingly significant, alongside the conventional removal of hydrogen sulfide ($H_2S$), carbon dioxide ($CO_2$) and the drying or removal of water. Usually, the water components and the mercaptans are removed by adsorption on suitable adsorbents, for example molecular sieves, which entails periodic regeneration of the adsorbents. In the regeneration, the adsorbed trace constituents are typically removed by contacting the laden adsorbents with a purge gas in such a way that desorption or elution, i.e. leaching-out during a short PERIOD, generates a highly concentrated peak flow of the trace constituents in the regeneration offgas, i.e. a "peak", whereas the regeneration offgas contains a much lower level of or even no trace constituents any longer during the remaining regeneration time, i.e. particularly before and after the elution of the peak.

The regeneration offgas containing the unwanted trace constituents has to be subjected to an aftertreatment since it cannot be released as such to the atmosphere. Therefore, in order to recover the trace components from the regeneration offgas, the aftertreatment of the regeneration offgas has to be designed for the highly concentrated peak flow of the trace constituents as well. In the continuous offgas treatment processes known from the prior art, gas scrubbing is effected using a liquid absorbent or scrubbing medium. Known and frequently employed process is of this kind are the Rectisol process and the Purisol process, both described in principle in Ullmann's Encyclopedia of Industrial Chemistry, 6th ed. vol. 15, p. 399 ff. These processes consist mainly of an absorption step and a regeneration step in which the offgas containing the trace components is released.

In the Rectisol process, the abovementioned unwanted troublesome components are absorbed by means of cold methanol, i.e. methanol cooled significantly below ambient temperature, as absorbent or scrubbing medium, wherein there is intense mass transfer between the crude gas and the absorbent or scrubbing medium in an absorber column, also referred to scrubbing column. The solubility of the unwanted gas constituents increases significantly here with falling temperature of the methanol and increasing pressure, whereas it remains virtually constant for hydrogen and carbon monoxide. Methanol additionally has the advantage of still having a low viscosity even at temperatures down to −75° C. and hence of having good mass and heat transfer properties. The methanol laden with the troublesome components which is used as scrubbing medium is circulated via regeneration apparatuses in the Rectisol process.

In the Purisol process, which is likewise a physical absorption process, the trace components are absorbed by means of N-methylpyrrolidone (NMP) as absorbent or scrubbing medium at ambient temperature or—in conjunction with a refrigeration plant—at temperatures down to −15° C. In this gas scrubbing process too, the scrubbing medium is regenerated by treatment in a regeneration plant by heating, flashing or stripping with inert gases, and recycled to the absorption part of the plant. Typical working pressures and working temperatures in the Purisol process are, respectively, between 5 and 80 bar(a) and between 0 and 60° C., and in some cases also below that as set out above. The scrubbing medium is regenerated by decompression, if required also by heating. The sulfur-containing components driven out are converted to elemental sulfur in a Claus plant. The regenerated physical scrubbing medium is reintroduced into the absorption.

Unless particular measures are taken, the trace component peak persists in the absorption and regeneration system for after treatment of the regeneration offgas. This fluctuation in the trace components over time, for example in the sulfur components, is often unacceptable for downstream plants. For instance, in the case of the removal of sulfur components, the offgas from the scrubbing medium regeneration is frequently sent to a Claus plant for obtaining sulfur. However, this plant is unable to easily process concentrations of the sulfur components that vary significantly with time; instead, it requires a largely constant inflow over time. Feed gas streams that may be subject to variations with time with regard to the amount or concentration of the sulfur components cannot be processed in a disadvantageous manner in a Claus plant, and can only be combusted in a flare.

In order, therefore, to avoid or at least to reduce the fluctuation in the trace components with time, document DE 10 2005 059 101 A1 proposes installing a retention vessel in which the absorbent laden with the trace components from at least one regeneration cycle is intermediately stored and mixed before it is guided to the regeneration section. This achieves smoothing of the concentration profile of the trace components with time in the offgas supplied to the downstream plant. Disadvantages here, however, are the large volumes of the scrubbing medium designed for the peak concentration in the trace component peak, the vessel required for the intermediate storage, and the correspondingly large capacities of the conveying apparatuses required, especially pumps and pipelines. The space required for the setup of the large intermediate vessel within the aftertreatment plant is often also critical.

SUMMARY

The problem addressed by the present invention is therefore that of configuring the processes described at the outset for aftertreatment of regeneration offgases that are obtained in the regeneration of laden adsorbents by contacting with a purge gas stream so as to ensure an essentially homogeneous inflow of the physical scrubbing medium laden with trace components, for example with sulfur-containing components, to the scrubbing medium regeneration and hence also homogeneous outflow of the offgases containing the sulfur-containing components from the scrubbing medium regeneration to a downstream plant, for example a Claus plant.

This problem is solved essentially by a process having the features of claim 1. Further configurations, especially preferred configurations, of the process according to the invention can be found in the dependent claims.

Process Aaccording to the Invention

Process for cleaning a regeneration offgas which is obtained in the regeneration of a sorbent laden with a target component by passing a purge gas over or through it, comprising the following process steps:

(a) providing the sorbent laden with the target component and the purge gas, (b) introducing the purge gas as continuous purge gas stream into a sorbent vessel containing the laden sorbent and discharging the purge gas stream laden with the target component as regeneration offgas stream from the sorbent vessel, wherein the target component is eluted at some juncture as a peak from the sorbent vessel and an at least partly regenerated sorbent is obtained, (c) introducing the regeneration offgas stream into a gas scrubbing apparatus, contacting the regeneration offgas stream with a scrubbing medium in the gas scrubbing apparatus, discharging the regeneration offgas stream that has been at least partly freed of the target component and the scrubbing medium laden with the target component from the gas scrubbing apparatus, characterized in that, during the entry of the peak of the target component into the gas scrubbing apparatus and for defined periods of time tv, tn before and after the entry of the peak of the target component into the gas scrubbing apparatus, the regeneration offgas stream is contacted with a first volume flow rate of the scrubbing medium and the scrubbing medium laden with the target component is stored at a first pressure in a first intermediate vessel, and in that, for periods before tv and after tn, the regeneration offgas stream is contacted with a second volume flow rate of the scrubbing medium and the scrubbing medium laden with the target component is stored at a second pressure in a second intermediate vessel.

In the context of the present invention, sorbents are understood to mean all media that allow the target component to be taken up and bound at their surface (adsorption) or in their volume (absorption). These may frequently but not exclusively be solids in the case of adsorption, and liquids in the case of absorption.

A peak in the context of the present invention shall be understood to mean any concentration profile which varies over time and which, proceeding from a base value or a baseline, at first has an ascending profile and subsequently a declining profile and finally returns to or at least asymptotically approaches the base value or the baseline. In the latter variant, the person skilled in the art, on the basis of his experience, will make a decision as to when the base value or baseline has been reached again. The decision as to the times tv, tn before and after the peak can be made by monitoring the concentration profile over time with customary analysis methods. In this way, it is possible to fix defined junctures tv, tn before and after the peak of the target component enters the gas scrubbing apparatus by appropriate routine tests.

When it is stated that the laden scrubbing medium is introduced from the first intermediate vessel into the second in such a way that a scrubbing medium stream can be discharged therefrom with a concentration of the target component that varies less over time compared to the regeneration offgas stream and is preferably constant with time, this shall encompass all measures that the person skilled in the art will typically employ in order to bring about such balancing of concentration in terms of time and/or place. Examples for this purpose are the provision of a mixing apparatus, for example a stirrer or static mixer, in the second intermediate vessel. Alternatively, the laden scrubbing medium can be introduced from the first intermediate vessel into the second with high momentum, such that the turbulence imposed on the introduction stream leads to the desired mixing.

Balancing of pressure shall be understood to mean not exclusively the implementation of complete pressure equality in the communicating regions, but also, in a broader sense, alignment of the pressures in these regions without achieving complete pressure equality at the end of the operation.

Any pressure figures in the unit bar(a) are based on the absolute pressure in bar, absolute, unless stated otherwise in the individual case.

The invention is based on the finding that it is advantageous to make available the high mass flow rate of scrubbing medium required for reliable absorption of the target component in the gas scrubbing apparatus not over the entire duration of operation of the process but only during the period of time during which the peak of the target component enters the gas scrubbing apparatus.

For this purpose, according to the invention, the flow diagram known from the prior art is supplemented with a vessel for scrubbing medium having a high target component loading. The already existing vessel according to DE 10 2005 059 101 A1 downstream of the gas scrubbing apparatus, for example the absorption column, is used to store scrubbing medium with a low target component loading (second intermediate vessel).

Shortly before, during and shortly after the entry of the peak of the target component into the gas scrubbing apparatus, the scrubbing medium laden with the target component is introduced into the vessel for scrubbing medium having a high target component loading (first intermediate vessel). This phase typically takes one hour, for example, under typical process conditions.

After the end of the peak, the laden scrubbing medium is guided from the gas scrubbing apparatus to the vessel for scrubbing medium having a low target component loading (second intermediate vessel). In parallel, the vessel for scrubbing medium having a high target component loading is emptied and its contents are likewise added to the vessel for scrubbing medium having a low target component loading, with mixing of the scrubbing media having high and low loading. The mixing can be further enhanced by providing mixing apparatuses, for example stirrers, static mixers, guide plates, in or on the vessel for scrubbing medium having a low target component loading and/or introducing the scrubbing medium having a high target component loading into the vessel with turbulence. In this way, a concentration profile that fluctuates less significantly over time compared to the peak profile in the absorption column is obtained in the plant components connected downstream of the vessel for scrubbing medium having a low target component loading. In the extreme case, i.e. in the case of ideal backmixing in the vessel, the concentration of the target component in the scrubbing medium stream leaving the vessel is constant over time.

This scrubbing medium stream is then guided from the vessel for scrubbing medium having a low target component loading to the scrubbing medium regeneration apparatus. Since the scrubbing medium has a more stable concentration of the target component that varies less over time, for example a more constant mercaptan content, an offgas with a more stable composition is produced in the scrubbing medium regeneration apparatus and can be released to downstream process stages. In the case of mercaptans as target component, this may be, for example, a sulfur recovery stage after the Claus process.

PREFERRED EMBODIMENTS OF THE INVENTION

A particularly preferred configuration of the process according to the invention is characterized in that the first volume flow rate is greater than the second volume flow rate. As a result, a greater amount of scrubbing medium is available exactly when the peak of the target component, i.e. the trace component to be removed, for example sulfur-containing components, enters the gas scrubbing apparatus. This leads to more effective removal of the target component. On the other hand, the gas scrubbing apparatus is operated only with a small flow rate of the scrubbing medium at all other times, i.e, at times before tv and after tn. The occurrence of scrubbing medium to be regenerated is therefore considerably reduced compared to the processes known from the prior art, especially compared to the process taught in document DE 10 2005 059 101 A1.

It has been found to be particularly advantageous when the first pressure is less than or equal to, preferably equal to, the pressure that exists in the gas scrubbing apparatus, and the second pressure is less than or equal to the first pressure. This reduces or prevents flashing-out of the target component; secondly, the pressure gradient assists the further conveying of the laden scrubbing medium from the gas scrubbing apparatus into the first intermediate vessel. For further assistance of the further conveying of the laden scrubbing medium, it is additionally possible to provide additional conveying devices, e.g. pumps, and/or to lay the corresponding connecting conduits with a gradient.

Preferably, the vessel for scrubbing medium having a high target component loading is operated at the same pressure as the gas scrubbing apparatus in order to prevent the target component from flashing out. The vessel for scrubbing medium with a low target component loading is preferably operated at a lower pressure and any flash gases are guided to the scrubbing medium regeneration apparatus.

In one aspect of the process according to the invention, the target component is at least one sulfur compound selected from the following group: mercaptans, hydrogen sulfide, carbonyl sulfide, total sulfur content as cumulative parameter. The compounds mentioned occur, for example, as unwanted accompanying substances in natural gases or crude synthesis gas. They are unwanted especially because they act as a troublesome component in downstream further processing stages, one reason being that they are catalyst poisons in catalytic methods. Some analysis methods determine the total sulfur content as a cumulative parameter; in these cases, the emphasis is on reducing this total sulfur content by means of the process according to the invention.

In a preferred process configuration, the sorbent is laden with the target component in the sorptive purification of a natural gas stream or a synthesis gas stream. This process configuration accordingly relates more particularly to the aftertreatment of a regeneration offgas stream by gas scrubbing with a scrubbing medium, wherein the regeneration offgas stream is released from a sorbent, for example an adsorbent, that has been laden with sulfur-containing components, for example with mercaptans, in the cleaning of natural gas or synthesis gas.

In a further preferred process configuration, the scrubbing medium contains one or more components selected from the following group: methanol, N-methylpyrrolidone (NMP), secondary amines, preferably diethanolamine, tertiary amines, preferably methyldiethanolamine, polyethylene glycol dialkyl ethers, preferably polyethylene glycol dimethyl ether. The components mentioned are suitable individually or in a mixture as physical scrubbing media for removal of many target components, especially also of sulfur components such as mercaptans.

In a further aspect of the process according to the invention, for periods before tv and after tn, the scrubbing medium laden with the target component is discharged from the first intermediate vessel and introduced into the second intermediate vessel, wherein the first intermediate vessel is at least partly emptied and wherein the introduction into the second intermediate vessel is effected in such a way that a scrubbing medium stream can be discharged therefrom with a concentration of the target component that varies less over time compared to the regeneration offgas stream and is preferably constant with time. As a result, the first intermediate vessel is prepared for the acceptance of the laden scrubbing medium on passage of the next target component peak through the gas scrubbing apparatus. Moreover, in the second intermediate vessel, mixing results in a laden scrubbing medium with an average concentration of the target component that varies to a lesser degree over time, which is of much better suitability for the scrubbing medium regeneration apparatus and any treatment or processing plants further downstream.

A further preferred process configuration is characterized in that the first pressure is greater than the second pressure, and in that the scrubbing medium laden with the target component is emptied from the first intermediate vessel into the second intermediate vessel by balancing of pressure. The pressure gradient assists the further conveying of the laden scrubbing medium from the gas scrubbing apparatus into the first intermediate vessel. For further assistance of the further conveying of the laden scrubbing medium, it is additionally possible to provide additional conveying devices, e.g, pumps, and/or to lay the corresponding connecting conduits with a gradient. Any proportions of the target component that have been desorbed, i.e. flashed-out, owing to the decrease in pressure are guided together with the laden scrubbing medium from the second intermediate vessel to the scrubbing medium regeneration apparatus.

In a further preferred process configuration, the scrubbing medium laden with the target component is continuously discharged from the second intermediate vessel and introduced into a scrubbing medium regeneration apparatus, wherein scrubbing medium at least partly freed of the target component is discharged from the scrubbing medium regeneration apparatus and recycled to the gas scrubbing apparatus and wherein a stream of matter comprising the target component is also discharged from the scrubbing medium regeneration apparatus. In this way, the regenerated scrubbing medium can be reused and a continuous scrubbing medium circuit is formed. The stream of matter which comprises the target component and is discharged from the scrubbing medium regeneration apparatus can be sent to a downstream treatment or processing plant.

In a further aspect of the process according to the invention, the recycling of the scrubbing medium at least partly freed of the target component to the gas scrubbing apparatus gives rise to a scrubbing medium circuit, wherein the volume flow rate of the scrubbing medium in the scrubbing medium circuit corresponds to the second volume flow rate. The second volume flow rate accordingly assures the base load of the gas scrubbing process, whereas the first volume flow rate is available for the peak load when a peak of the target component enters the gas scrubbing apparatus.

Preferably, the process according to the invention is configured such that, for periods before tv and after tn, the recycled scrubbing medium, before entering into the gas scrubbing apparatus, flows through and fills a third intermediate vessel, wherein the scrubbing medium stored intermediately in the third intermediate vessel is guided to the gas scrubbing apparatus for periods between tv and tn. Thus, the first volume flow results from the sum total of the second, continuously circulating volume flow and the additional flow generated by emptying the third intermediate vessel, which is provided for the period of time between tv and tn, i.e. when a peak of the target component enters the gas scrubbing apparatus.

In a development of the process according to the invention, the stream of matter which comprises the organic sulfur compound as target component and is discharged from the scrubbing medium regeneration apparatus is introduced into a plant for obtaining sulfur by the Claus process. The Claus process is a tried-and-tested process known per se for sulfur recovery. The sulfur obtained from the target component removed is thus obtained as a material value.

BRIEF DESCRIPTION OF THE DRAWINGS

Further features, advantages and possible applications of the invention are also apparent from the description of working examples which follows and the drawings. All the features described and/or depicted, on their own or in any combination, form the subject-matter of the invention, irrespective of their combination in the claims or their relationship.

The figures show.

DETAILED DESCRIPTION OF PREFERRED EMBODIMENTS

Figure 1:
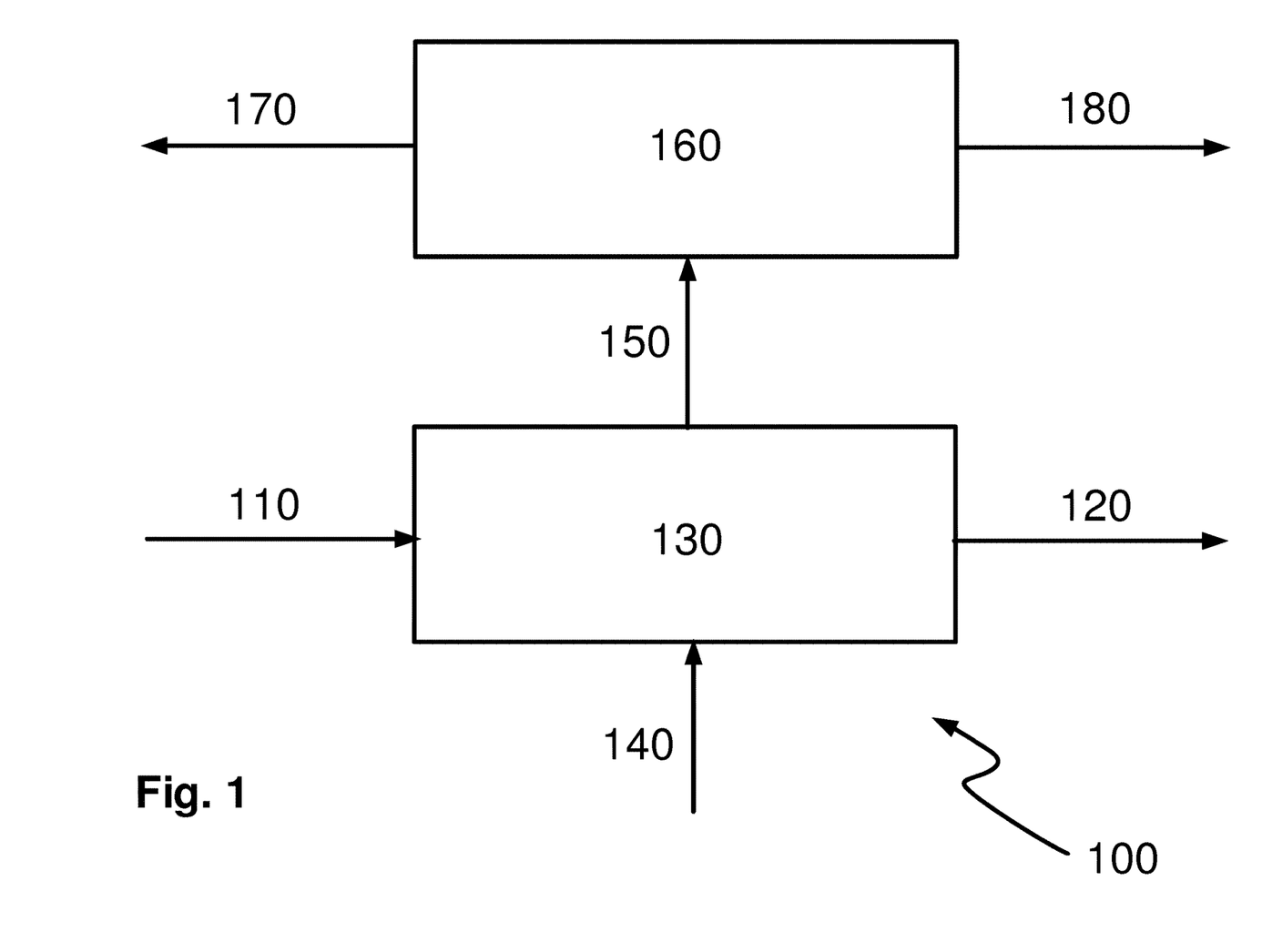
FIG. 1 is a block flow diagram of an adsorption unit for mercaptan removal from natural gas with downstream cleaning of the regeneration offgas.

FIG. 1 shows, in schematic form, a block flow diagram of an adsorption unit 100 for mercaptan removal from natural gas with downstream purification of the cleaning offgas. Via conduit 110, the adsorber 130 is supplied with mercaptan-containing natural gas. The natural gas has been treated beforehand in a dehydration unit to adjust its dew point. The adsorber has been charged with a commercial adsorbent based on molecular sieve. Via conduit 120, the natural gas that has been freed of mercaptans is discharged from the adsorber and sent to further treatment or processing.

When the adsorber has been laden with mercaptans up to its capacity limit, the supply of natural gas via conduit 110 is ended and the adsorber is contacted with a regeneration gas, for example nitrogen or cleaned natural gas, via conduit 140. In parallel, the temperature of the laden adsorbent is usually increased by means of a heating apparatus in order to accelerate the desorption of the mercaptans. The regeneration gas stream can also be preheated for this purpose. During the regeneration, the adsorptive treatment of the natural gas is conducted in adsorption units connected in parallel (not shown), since such plants are usually executed in multi-strand form. Integrated unit systems of, for example, 3 to 6 adsorption units connected in parallel are customary. The regeneration cycle typically includes the following operation stages: (a) lowering the pressure, (b) contacting the laden adsorbent with regeneration gas, (c) heating to hold temperature, (d) purging with regeneration gas at the hold temperature, (e) cooling, (f) increasing the pressure to adsorption pressure, (g) contacting with natural gas.

The laden regeneration gas that leaves the heated adsorbent is guided, for example, to an air cooler, where it is cooled down to 60° C., for example. It is guided further to a separator in order to separate the hydrocarbon phase and the aqueous phase. After the heating phase, in which the mercaptans are removed as a peak, the adsorbent is also purged with heated regeneration gas in order to remove trace constituents that take more time for desorption. Finally, the adsorbent is cooled down by introducing cold regeneration gas through the regenerated adsorber. After cooling, the adsorber is put under pressure again. Then the adsorbent is ready for the adsorption mode and the next cycle commences.

Via conduit 150, the regeneration gas stream laden with the desorbed mercaptans is introduced into the gas scrubbing apparatus with downstream scrubbing medium regeneration apparatus 160. The gas scrubbing apparatus in the present working example is configured in accordance with the Purisol process, wherein the mercaptans are separated out of the regeneration gas with an NMP-containing scrubbing medium. Via conduit 170, a regeneration gas freed of mercaptans is removed and added, for example, to a fuel gas mixture. Via conduit 180, a gas stream enriched in mercaptans is removed and guided to a sulfur recovery plant that works by the Claus process.

The configuration of the apparatus according to reference numeral 160, the gas scrubbing apparatus with downstream scrubbing medium regeneration apparatus, is the subject-matter of the present invention. This configuration is elucidated in detail in FIG. 2 (state of the art) and FIG. 3 (invention).

Figure 2:
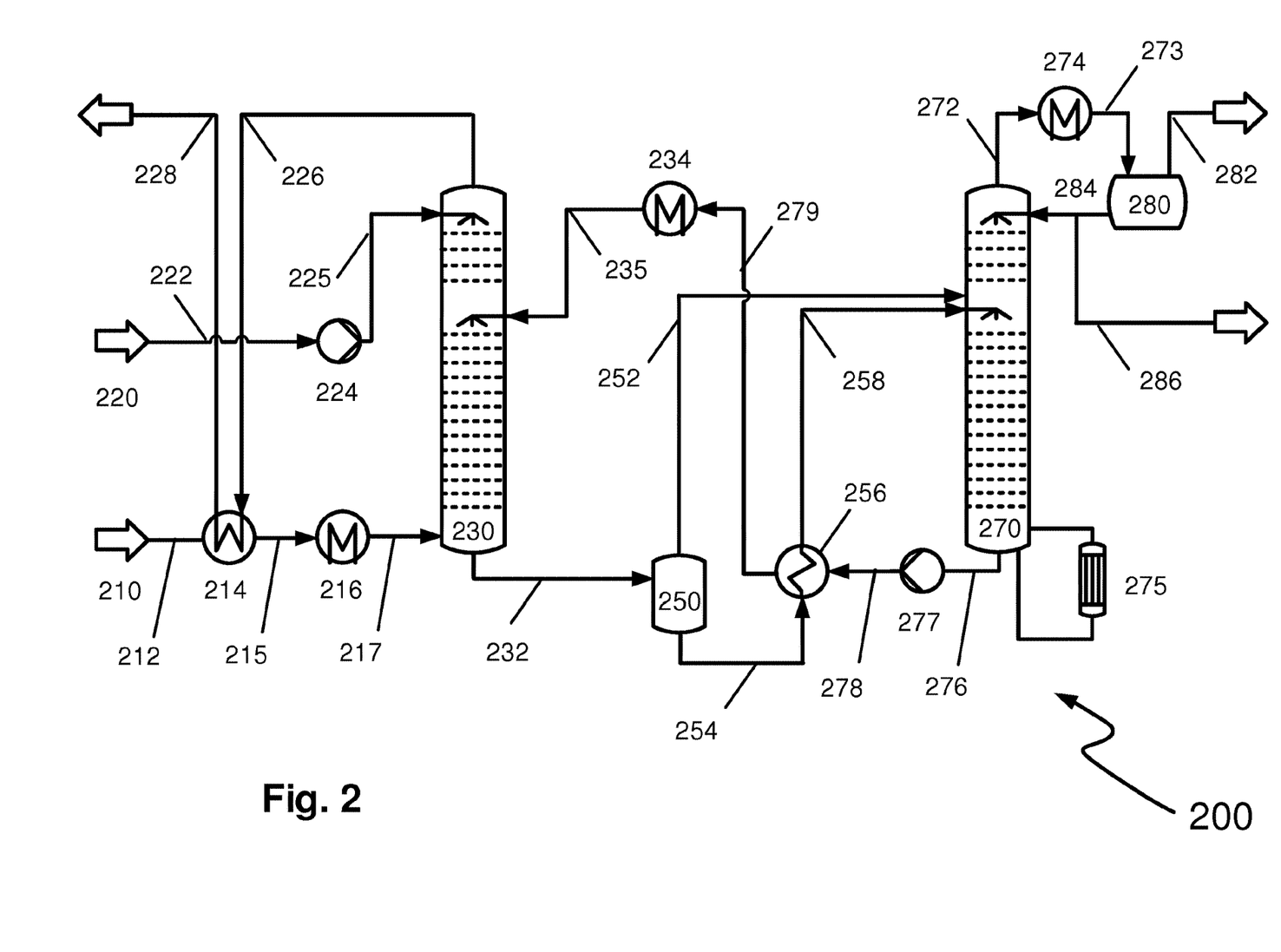
FIG. 2 is a schematic diagram of a process for purifying the regeneration offgas according to prior art.

FIG. 2 shows a schematic diagram of a process or of a corresponding plant for purification of the regeneration offgas according to prior art, for example according to DE 10 2005 059 101 A1.

FIG. 2 shows a plant 200 comprising a gas scrubbing apparatus with downstream scrubbing medium regeneration apparatus. Via entry point 210 and conduits 212, 215, 217, the regeneration offgas laden with mercaptans is guided to the gas scrubbing apparatus 230 and introduced into it at its lower end. The regeneration offgas is cooled beforehand in the heat exchangers 214 (against cold, cleaned regeneration offgas) and 216.

The regeneration offgas laden with mercaptans passes from the bottom upward through the gas scrubbing apparatus configured as an absorption column and as it does so meets the NMP-containing scrubbing medium in countercurrent, which is introduced into the gas scrubbing apparatus via conduit 235 and is distributed over the cross section thereof via the liquid distributor indicated. In addition, in the upper region of the gas scrubbing apparatus, demineralized water is introduced via conduit 225 and a further liquid distributor, and is brought in via entry point 220, conduit 222 and pump 224, and serves to remove entrained washing medium residues from the cleaned regeneration offgas. Via conduits 226 and 228, the cleaned regeneration offgas that has been freed of washing medium residues is discharged from the process and subsequently added to a fuel gas mixture, for example, or utilized again as regeneration gas or for another purpose. It is heated up beforehand in the heat exchanger 214 in indirect heat exchange against regeneration offgas laden with mercaptans. The residual sulfur content in the cleaned regeneration offgas is typically less than 5 ppmv.

From the bottom of the gas scrubbing apparatus (absorption column), via conduit 232, the scrubbing medium laden with mercaptans is discharged and guided to the intermediate vessel 250. In the present working example, this is designed for a dwell time of about six hours, which corresponds to a regeneration cycle for the adsorbers in the adsorption unit 130. The intermediate storing of the laden scrubbing medium balances out the variations in the loading of the scrubbing medium with mercaptans, which are caused by the regeneration cycles and the fluctuating parameters such as pressure, temperature and mercaptan concentration. Without such balancing, there would be significant variations in the acid gas removed from the scrubbing medium regeneration and subsequently also disrupted operation in the sulfur recovery plant downstream of the scrubbing medium regeneration apparatus.

Via conduit 254, intermediately stored scrubbing medium laden with mercaptans is discharged from the intermediate vessel and, after heating in the heat exchanger 256, introduced via conduit 258 and the liquid distributor indicated into the upper region of the scrubbing medium regeneration apparatus 270, configured as a distillation column. Any gases obtained by flashing-out in the intermediate vessel are likewise introduced into the scrubbing medium regeneration apparatus via conduit 252.

In the scrubbing medium regeneration apparatus, the scrubbing medium laden with mercaptans is regenerated by heating. For this purpose, the column 270 is supplied with energy via reboiler 275. The gases desorbed as a result are discharged via conduit 272 and the condensable components are condensed by cooling by means of heat exchanger 274, discharged via conduit 273 and collected in vessel 280. The gaseous components, which also include the mercaptans, are discharged from the process via conduit 282 and can be sent, for example, to a downstream plant for sulfur recovery. Via conduit 284, a portion of the condensate is recycled as return stream to the scrubbing medium regeneration apparatus, and another portion of the condensate is discharged from the process via conduit 286.

From the bottom of the scrubbing medium regeneration apparatus 270 configured as a distillation column, via conduit 276, pump 277 and conduit 278, the regenerated scrubbing medium is discharged and precooled in the heat exchanger 256 in indirect heat exchange against cold, laden scrubbing medium. The precooled, regenerated scrubbing medium is recycled via conduit 279 and 235 to the gas scrubbing apparatus 230 and introduced into it via a liquid distributor, wherein the scrubbing medium is cooled further by means of heat exchanger 234 prior to introduction into the gas scrubbing apparatus.

Figure 3:
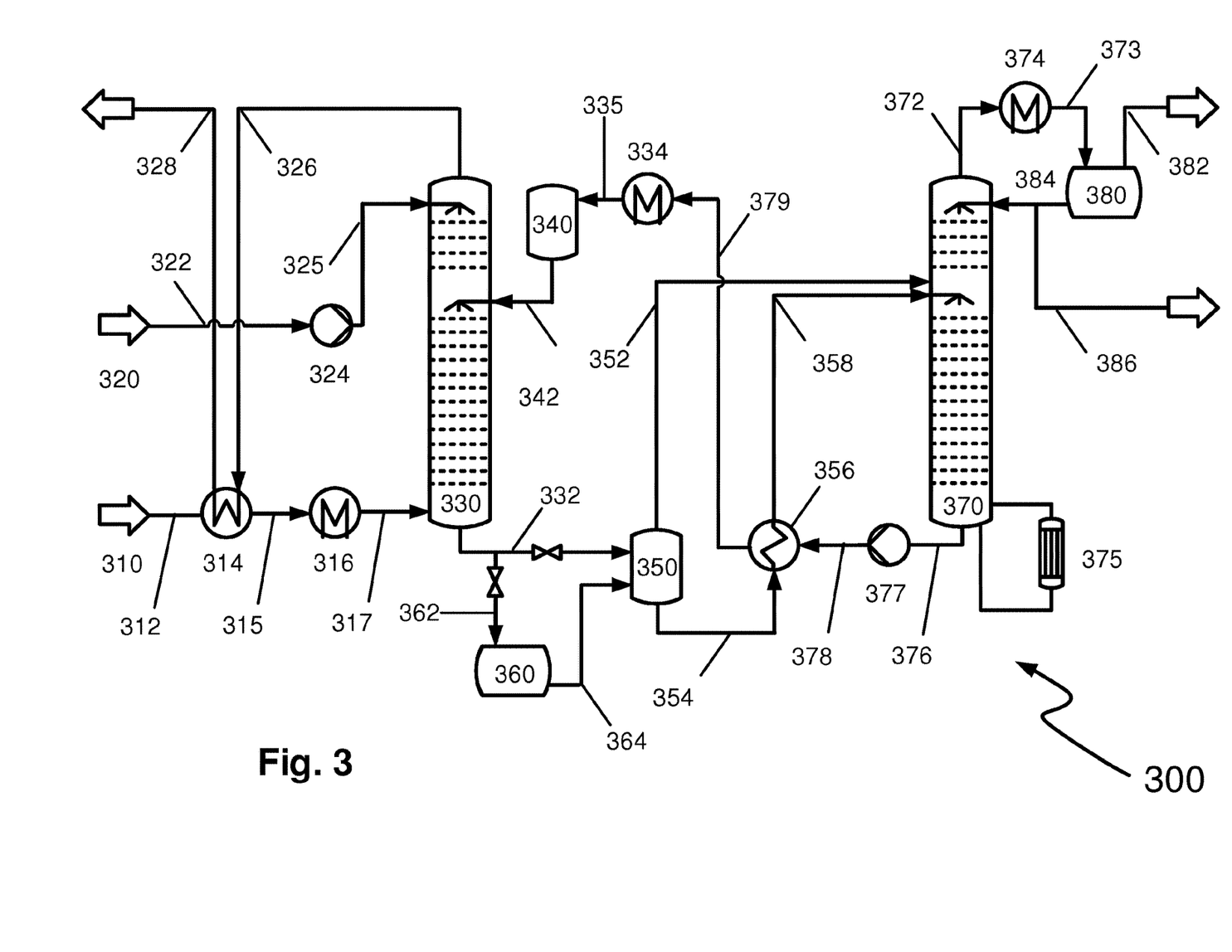
FIG. 3 is a schematic diagram of a preferred configuration of the process of the invention or of a corresponding plant.

FIG. 3 shows a schematic diagram of a process or a corresponding plant in a preferred configuration of the present invention. Plant components with reference numerals 3nn correspond here to those in FIG. 2 with 2nn. New additions are the vessel 360 (first intermediate vessel) that serves to accept the scrubbing medium laden with mercaptans during the entry of the mercaptan peak into the gas scrubbing apparatus. In addition, there is also the vessel 340 (third intermediate vessel) which serves for intermediate storage of a supply of regenerated scrubbing medium, where the vessel 340 is emptied into the gas scrubbing apparatus during the entry of the mercaptan peak into it and in this way ensures a greater flow rate of regenerated scrubbing medium. In addition, there are the corresponding connecting conduits 362, 364 and 342.

The basis of the process of the invention is that the flow rate of regenerated scrubbing medium is coupled directly to the release of the mercaptan peak in the regeneration of the laden adsorbent. During the heating of the adsorbent during the regeneration, the desorption of the mercaptans is accelerated, which, as a result thereof, are released as a peak to the regeneration offgas. Therefore, the flow rate of regenerated scrubbing medium to the gas scrubbing apparatus is then increased, such that the NMP-containing scrubbing medium can reliably absorb the mercaptan peak in the regeneration offgas.

The scrubbing medium laden with mercaptans which is withdrawn at the base or in the bottom of the gas scrubbing apparatus is then guided via corresponding actuation of the barrier valves indicated to the first intermediate vessel 360 which is at the same pressure as the gas scrubbing apparatus. Vessel 360 is designed for a charge time under normal flow conditions of about one hour. Experience has shown that the duration of the mercaptan peak under customary regeneration conditions is about 20 to 30 minutes. In order to take account of variations with regard to peak duration and elution time, the flow rate of regenerated scrubbing medium to the gas scrubbing apparatus is already increased a few minutes before the entry of the mercaptan peak into the gas scrubbing apparatus expected on the basis of calculations or preliminary experiments; in addition, the elevated flow rate is maintained for a further run time likewise ascertained by preliminary experiments.

Alternatively, the mercaptan content in the regeneration offgas can be measured by means of online analysis methods and utilized as an indicator for the required adjustment in the scrubbing medium flow rate.

During the rest of the duration of the regeneration cycle of the adsorbent, the mercaptan concentration in the regeneration offgas is much lower or even negligible, and so the flow rate of regenerated scrubbing medium to the gas scrubbing apparatus can be reduced. During this period of time, the laden scrubbing medium which is withdrawn at the base of the gas scrubbing apparatus is guided to the second intermediate vessel 350. The scrubbing medium with a low loading is mixed therein with a portion of the more highly laden scrubbing medium stored in the first intermediate vessel 360. This is preferably effected with flow control, such that vessel 360 is emptied gradually and is then available for refilling during the passage of the next mercaptan peak in the subsequent regeneration cycle.

Vessel 350 is preferably at a lower pressure level, such that no pump is required to convey laden scrubbing medium from vessel 360 into vessel 350. Any gases released by flashing-out are guided via conduit 352 directly to the scrubbing medium regeneration apparatus 370.

During the passage of the mercaptan peak through the gas scrubbing apparatus, vessel 350 is not filled from the gas scrubbing apparatus. For this reason, vessel 350 also serves as buffer vessel for the continuous scrubbing medium regeneration apparatus and is designed, for example, for a buffer time of one hour. Therefore, in this phase, the liquid level in the vessel 350 begins to fall, but it rises again after the end of the passage of the mercaptan peak through the gas scrubbing apparatus.

The mixture of scrubbing medium with low and high loading is discharged from vessel 350, preheated in the heat exchanger 356 and finally guided to the middle section of the scrubbing medium regeneration apparatus configured as a distillation column or stripping column. The gaseous mercaptans released by flashing in vessel 350 are likewise guided to the scrubbing medium regeneration apparatus and introduced into it above the addition point for the laden scrubbing medium.

In the scrubbing medium regeneration apparatus, regeneration is achieved by means of steam stripping. For this purpose, steam is raised by means of the reboiler 275, using medium-pressure steam as heating medium. The base or bottom temperature of the scrubbing medium regeneration apparatus is controlled by guiding defined amounts of demineralized water into it and process water out of it via conduits (not shown).

The top product from the scrubbing medium regeneration apparatus comprises the stripped-out mercaptan gas (acid gas) with a considerable water content. It is cooled to 40° C. by means of heat exchanger 374, and the condensate with a high water content obtained is discharged via conduit 373 and collected in vessel 380. A wire braid packing in vessel 380 serves to remove droplets from the acid gas containing the mercaptans that leaves the vessel 380 via conduit 382 and is guided to the sulfur recovery plant (not shown).

The condensate with a high water content which is collected in the vessel 380 provided with level control is recycled into the upper part of the scrubbing medium regeneration apparatus as return stream. It serves as scrubbing medium therein to minimize the scrubbing medium losses, for example of the NMP, with the stripped gas stream.

From the bottom of the scrubbing medium regeneration apparatus 370, via conduit 376, pump 377 and conduit 378, the regenerated scrubbing medium is discharged and precooled in the heat exchanger 356 in indirect heat exchange against cold, laden scrubbing medium. It is optionally possible to add an antifoam to the regenerated scrubbing medium in order to prevent or reduce foaming in the gas scrubbing apparatus. The precooled, regenerated scrubbing medium is cooled in the heat exchanger 334 and guided via conduit 379 and 335 to the third intermediate vessel 340.

The third intermediate vessel 340 serves as buffer vessel for intermediate storage of regenerated scrubbing medium in order to be able to ensure an elevated scrubbing medium flow rate on passage of the mercaptan peak through the gas scrubbing apparatus. At that point, the level in vessel 340 begins to fall. During the subsequent peak-free phase, the level in vessel 340 rises again.

It may be advisable to conduct a bypass conduit (not shown) around the vessel 340 in order that the regenerated scrubbing medium, if required, can be introduced directly into the gas scrubbing apparatus without intermediate storage.

INDUSTRIAL APPLICABILITY

The invention provides a process and a plant for reducing the size of a regeneration offgas treatment unit. The process comprises a scrubbing medium-based treatment of a regeneration offgas stream which is released from an adsorption unit, wherein the regeneration offgas stream is characterized by variation in the amount and/or concentration of the unwanted component over time, for example of the sulfur components, and these are desorbed from the adsorption unit especially as a peak. According to the invention, for this purpose, during the entry of the desorption peak into the gas scrubbing apparatus, the amount of scrubbing medium is increased proceeding from a normal value during a first phase and, after the end of the desorption peak, the amount of scrubbing medium is returned back to the normal value during a second phase, wherein the laden scrubbing media are collected in different intermediate vessels during the two phases, mixed and released as a mixture to a downstream scrubbing medium regeneration apparatus. The invention can accordingly reduce the size of the intermediate vessel known from the prior art, since this no longer has to accept the entire amount of the laden scrubbing medium obtained during a regeneration cycle.

LIST OF REFERENCE NUMERALS

100 adsorption unit with cleaning of the regeneration offgas
110 conduit
120 conduit
130 adsorber
140 conduit
150 conduit
160 gas scrubbing apparatus with scrubbing medium regeneration apparatus
170 conduit
180 conduit
x00 gas scrubbing apparatus with scrubbing medium regeneration apparatus
x10 entry point
x12 conduit
x14 heat exchanger
x15 conduit
x16 heat exchanger
x17 conduit
x20 entry point
x22 conduit
x24 pump
x25 conduit
x26 conduit
x28 conduit
x30 gas scrubbing apparatus
x32 conduit
x34 heat exchanger
x35 conduit
x50 second intermediate vessel
x52 conduit
x54 conduit
x56 heat exchanger
x58 conduit
x70 scrubbing medium regeneration apparatus
x72 conduit
x73 conduit
x74 heat exchanger
x75 reboiler
x76 conduit
x77 pump
x78 conduit
x79 conduit
x80 vessel x82 conduit
x84 conduit
x86 conduit
x=2: state of the art, x=3: invention)
340 third intermediate vessel
342 conduit
360 first intermediate vessel
362 conduit
364 conduit It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for cleaning a regeneration off-gas which is obtained in the regeneration of a sorbent laden with a target component by passing a purge gas over or through it, the process comprising:
   (a) providing the sorbent laden with the target component and the purge gas,
   (b) introducing the purge gas as continuous purge gas stream into a sorbent vessel containing the laden sorbent and discharging the purge gas stream laden with the target component as regeneration offgas stream from the sorbent vessel, wherein the target component is eluted at some juncture as a peak from the sorbent vessel and an at least partly regenerated sorbent is obtained,
   (c) introducing the regeneration off-gas stream into a gas scrubbing apparatus, contacting the regeneration off-gas stream with a scrubbing medium in the gas scrubbing apparatus, discharging the regeneration off-gas stream that has been at least partly freed of the target component and the scrubbing medium laden with the target component from the gas scrubbing apparatus,
   wherein, during the entry of the peak of the target component into the gas scrubbing apparatus and for defined periods of time tv, tn before and after the entry of the peak of the target component into the gas scrubbing apparatus, the regeneration off-gas stream is contacted with a first volume flow rate of the scrubbing medium and the scrubbing medium laden with the target component is stored at a first pressure in a first intermediate vessel, and in that, for periods before tv and after tn, the regeneration off-gas stream is contacted with a second volume flow rate of the scrubbing medium and the scrubbing medium laden with the target component is stored at a second pressure in a second intermediate vessel.

2. The process according to claim 1, wherein the first volume flow rate is greater than the second volume flow rate.

3. The process according to claim 1, wherein the first pressure is less than or equal to the pressure that exists in the gas scrubbing apparatus, and in that the second pressure is less than or equal to the first pressure.

4. The process according to claim 1, wherein the target component is at least one sulfur compound selected from the group consisting of: mercaptans, hydrogen sulfide, carbonyl sulfide, and total sulfur content as cumulative parameter.

5. The process according to claim 4, wherein the stream of matter which comprises the sulfur compound as target component and is discharged from the scrubbing medium regeneration apparatus is introduced into a plant for obtaining sulfur by the Claus process.

6. The process according to claim 1, wherein the sorbent has been laden with the target component in the sorptive cleaning of a natural gas stream or a synthesis gas stream.

7. The process according to claim 1, wherein the scrubbing medium comprises one or more components selected from the group consisting of: methanol, N-methylpyrrolidone (NMP), secondary amines, diethanolamine, tertiary amines, methyldiethanolamine, polyethylene glycol dialkyl ethers, and polyethylene glycol dimethyl ether.

8. The process according to claim 1, wherein, for periods before tv and after tn, the scrubbing medium laden with the target component is discharged from the first intermediate vessel and introduced into the second intermediate vessel, wherein the first intermediate vessel is at least partly emptied and wherein the introduction into the second intermediate vessel is effected in such a way that a scrubbing medium stream can be discharged therefrom with a concentration of the target component that varies less over time compared to the regeneration off-gas stream.

9. The process according to claim 8, wherein the first pressure is greater than the second pressure, and in that the scrubbing medium laden with the target component is emptied from the first intermediate vessel into the second intermediate vessel by balancing of pressure.

10. The process according to claim 1, wherein the scrubbing medium laden with the target component is continuously discharged from the second intermediate vessel and introduced into a scrubbing medium regeneration apparatus, wherein a scrubbing medium at least partly freed of the target component is discharged from the scrubbing medium regeneration apparatus and recycled to the gas scrubbing apparatus and wherein a stream of matter comprising the target component is also discharged from the scrubbing medium regeneration apparatus.

11. The process according to claim 10, wherein the recycling of the scrubbing medium at least partly freed of the target component to the gas scrubbing apparatus gives rise to a scrubbing medium circuit, wherein the volume flow rate of the scrubbing medium in the scrubbing medium circuit corresponds to the second volume flow rate.

12. The process according to claim 11, wherein, for periods before tv and after tn, the recycled scrubbing medium, before entering into the gas scrubbing apparatus, flows through and fills a third intermediate vessel, wherein the scrubbing medium stored intermediately in the third intermediate vessel is guided to the gas scrubbing apparatus for periods between tv and tn.

* * * * *